May 22, 1923.

C. L. MOYER 1,456,249

MACHINE FOR FORMING BOX BLANKS

Filed Jan. 5, 1922

INVENTOR:
Charles L. Moyer,
BY
Samuel N. Pond
ATTORNEY

May 22, 1923.  
C. L. MOYER  
MACHINE FOR FORMING BOX BLANKS  
Filed Jan. 5, 1922  
1,456,249  
8 Sheets-Sheet 2

Patented May 22, 1923.

1,456,249

UNITED STATES PATENT OFFICE.

CHARLES L. MOYER, OF CHICAGO, ILLINOIS, ASSIGNOR TO MORRIS PAPER MILLS, OF CHICAGO, ILLINOIS, A CORPORATION OF ILLINOIS.

MACHINE FOR FORMING BOX BLANKS.

Application filed January 5, 1922. Serial No. 527,218.

*To all whom it may concern:*

Be it known that I, CHARLES L. MOYER, a citizen of the United States, residing at Chicago, in the county of Cook and State of Illinois, have invented certain new and useful Improvements in Machines for Forming Box Blanks, of which the following is a specification.

This invention relates to machines for forming cardboard blanks used in the manufacture of cardboard boxes and cartons, such as are extensively used by merchants for the packaging of suits, clothing and dress goods and similar articles, such boxes usually comprising a body formed with upwardly bent side and end walls interlocked or stitched at the corners, and a lid or cover of similar shape and structure made sufficiently larger to fit down over the body.

The bodies and covers of such boxes are commonly made from a rectangular sheet of stiff paste board or cardboard that is preliminarily scored longitudinally and crosswise along the lines on which the side and end walls are bent up; and the machine of my present invention is designed to receive such prepared blanks, and has for its main function to break or bend the corners of the blank obliquely, so that as the side and end walls are turned upwardly, the rectangular corner pieces at the end of the side and end walls may be readily folded obliquely on themselves, thus forming a double walled flap which lies snugly against the inner side of either the side or end wall, usually the latter, and is either stitched or interlocked by tongues and slits to the latter. A further object or purpose of the present invention is to provide a machine for thus breaking or bending the corners of the blank which, by a simple adjustment of certain of the corner forming dies and the blank feeding mechanism, shall be capable of handling blanks of varying lengths and widths.

In a co-pending application filed by me April 29, 1921, Serial No. 465,433, I have disclosed a machine designed for the same general purpose as the present machine; the latter substantially following many of the general features and organization of the machine of the said application, differing from the latter chiefly in the specific devices employed to bend and break the corners of the blank. This mechanism in the aforesaid application comprises essentially a group of stationary male dies and a cooperating group of vertically reciprocating female dies. With a view to simplifying this corner folding and breaking mechanism, I have designed the present machine wherein the reciprocating female dies of the former machine are replaced by swinging folders, of which there are two at each corner operating on the end and side walls of the blank, respectively, with a corner bending or breaking blade carried by one of said folders and operating obliquely on the corner flap of the blank to break and fold it inwardly as the end and side walls of the blank are thrown up.

Other more specific objects and advantages of the invention will be apparent to persons skilled in the art as the same becomes better understood by reference to the following detailed description, taken in connection with the accompanying drawings, in which I have illustrated one practical embodiment of the invention, and wherein—

Fig. 8 is a top plan view of the parts shown in Fig. 7;

Figs. 10 and 11 are side and edge elevations, respectively, of one of the end wall folders;

Figure 22:
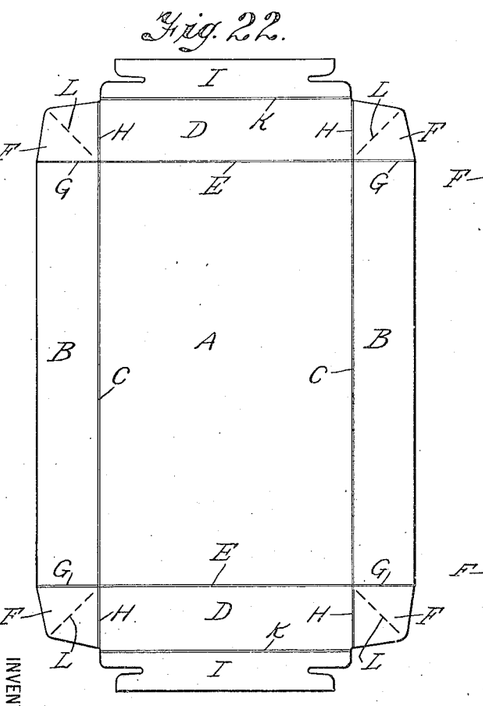
Fig. 22 is a top plan view of a cut and scored blank, such as is operated upon by the machine.
Figure 23:
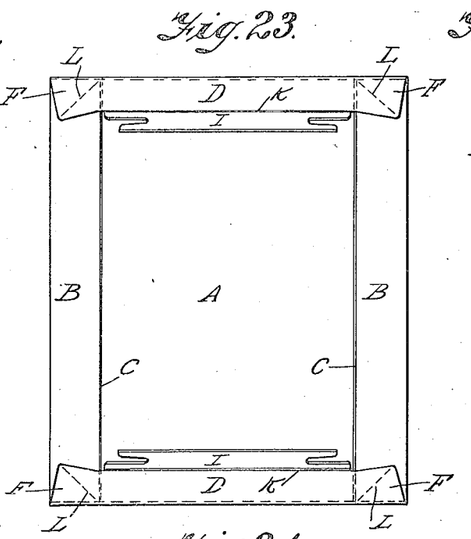
Fig. 23 is a plan view of the same blank showing the folded positions of its side and end walls and corners produced by the folding mechanism of the present machine.
Figure 24:
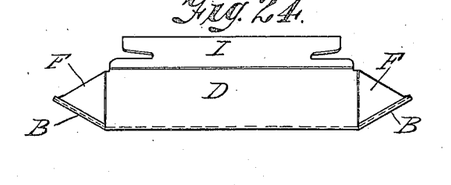
Figs. 24 and 25 are end and side elevations, respectively, of Fig. 22.
Figure 25:
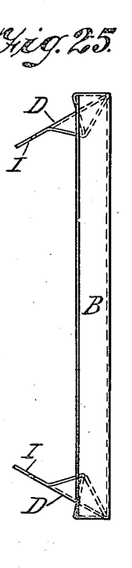

I will first briefly outline the general plan and organization of the machine, and will then describe the same more in detail by reference to the drawings. The cardboard blanks, in the form typically illustrated in Fig. 22 are carried through the machine between the contiguous laps of two pairs of endless belts, each pair comprising an upper belt and a lower belt; and in order to adapt the belts to handle blanks of varying widths, one pair of belts, with their supporting, guiding and actuating devices, are so mounted as to be bodily shiftable laterally relatively to the other pair. About midway of the length of the machine, the lower laps of the upper belts are upwardly offset, and the upper laps of the lower belts are downwardly offset to provide room for the mechanism that operates on the blank and by which the side and end walls of the latter are bent up, and the corner portions are broken and folded obliquely. In my present machine, this mechanism comprises four upper male die members which operate on the four corner portions of the blank, and are stationary in the operation of the machine, except that the two foremost members have hinged walls which swing upwardly and outwardly to permit the front end of the blank to pass freely beneath them without interference, and four corner folders cooperating with the four male dies, respectively, and each comprising a pair of hinged swinging plates disposed at right angles to each other and engaging with the end and side walls of the blank, respectively, one of said plates carrying an obliquely disposed blade by which the corner portion of the blank is broken and doubled inwardly. The foremost pairs of cooperating dies and folders, together with the pulleys which guide the offset portions of the belts are carried by a carriage which is mounted on and adjustable lengthwise of the main frame, so as to vary the length of the mechanism to handle blanks of varying lengths; and the two pairs of dies and folders on one side of the machine are so mounted as to be shiftable laterally relatively to the two pairs on the other side, so as to vary the width of the mechanism to handle blanks of varying widths.

At the entrance end of the machine is an automatic mechanism for controlling the admission of the successive blanks into the nip of the carrier belts. The pairs of belts between the forward and rear corner folding devices are automatically controlled by a mechanism which releases the grip of the belts on the blank during the instant that the folders are operating on the latter, and just beyond the folding members is an automatic stop which engages with the forward end of the blank as the latter reaches a position to be operated upon by the folders, and as soon as the folding and corner breaking operation is completed, is retracted to permit the blank to pass on again into the grip of the belts to be delivered from the machine. Also cooperating with the feed belts is a mechanism which, acting as a brake, serves to slow down the travel of the blank just before it engages with the stop above referred to, so as to avoid danger of buckling or bowing the blank as the latter is undergoing the folding and breaking operation.

Proceeding now to a more detailed description of the complete machine, 26 and 27 designate a pair of generally rectangular vertical parallel side frame members rigidly connected and spaced by heavy cross beams 28 and by numerous tie rods hereinafter referred to, most of which form supports for various operating parts. At the receiving end of the machine and attached to the forward end of the main side frames 26 and 27 are a pair of auxiliary side frame members 29 and 30 which extend upwardly some distance above the tops of the main frames 26 and 27, and are rigidly connected and spaced by rods hereinafter referred to.

Extending between and connecting the auxiliary frames 29 and 30 are a pair of parallel rods 31, on which are mounted a pair of diamond-shaped yokes 32 and 32'. In the upper ends of which are journaled belt pulleys 33 and 33' and in the lower ends of which are journaled similar belt pulleys 34 and 34'. The frame 32 is fixed on the shafts 31, while the frame 32' is adjustable on said shafts toward and from the frame 32 by means of a long screw 35 (Fig. 3) which extends through the frame 32'.

On a portion of the upper edges of the main side frames 26 and 27 are formed a pair of dove-tailed rails 36 (Fig. 5), slidably mounted on which is a carriage carrying the lower and upper adjustable belt supports and guides and also the forward pairs of blank corner folding and breaking devices. This carriage, as to its main structural features, includes a relatively heavy transversely disposed casting 37, the ends 37' of which are formed with dove-tailed channels on their undersides to slidably engage with the rails 36. On the inner face of the casting 37 are mounted a pair of blocks 38 and 38' (Fig. 5), the former being fixedly attached to the casting 37 and the latter being slidably mounted thereon. On the upper ends of the blocks 38 and 38' are flat tables or platforms 39, 39', respectively, these latter being preferably integral with the blocks 38, 38'.

Journaled on upstanding arms 40 and 41 carried by the table 39 and block 38, respectively, are a pair of rollers 42 and 43 (Fig. 4), and a downwardly offset roller 44 is journaled on the lower portion of the arm 41. The adjustable block 38' is similarly equipped with a group of three rollers, 42', 43' and 44' (Fig. 2) similar in relative location to the rollers 42, 43 and 44. Further along toward the rear end of the machine is a heavy stationary casting 45 (Fig. 6), generally similar to the casting 37 and permanently joined to and connecting the main side frames 26 and 27. On the inner face of the casting 45 are mounted a pair of blocks 46 and 46' structurally generally similar to blocks 38 and 38', the block 46 being rigidly attached to the casting 45 and equipped with a table or platform 47 integral therewith, and the block 46' being slidably mounted on the casting 45 and equipped with a table or platform 47'. Fastened to and depending from the blocks 46 and 46' are legs 48 and 48', in the lower ends of which are journaled rollers 49 and 49'. At the upper ends of the legs 48 and 48' are journaled belt rollers 50, 50', and downwardly offset therefrom are journaled other belt rollers 51, 51'.

Extending between the main side frame members are a pair of rods 52, and 53 (Figs. 4 and 16), mounted on and between which are a pair of yoke bars 54, 54', the bar 54 being fixed and the bar 54' being slidable laterally on said rods. Rigid with the forward sleeve bearings of the bars 54, 54' are arms 55, 55' carrying rollers 56, 56', respectively; and also attached to the yoke bars 54, 54' are angle bars 57, 57'. At the rear end of the machine frame is a transverse shaft 58, on which are a pair of belt driving pulleys 59 and 59' (Fig. 15), the pulley 59 being keyed to the shaft, and the pulley 59' being splined thereon.

Figures 1, 21:
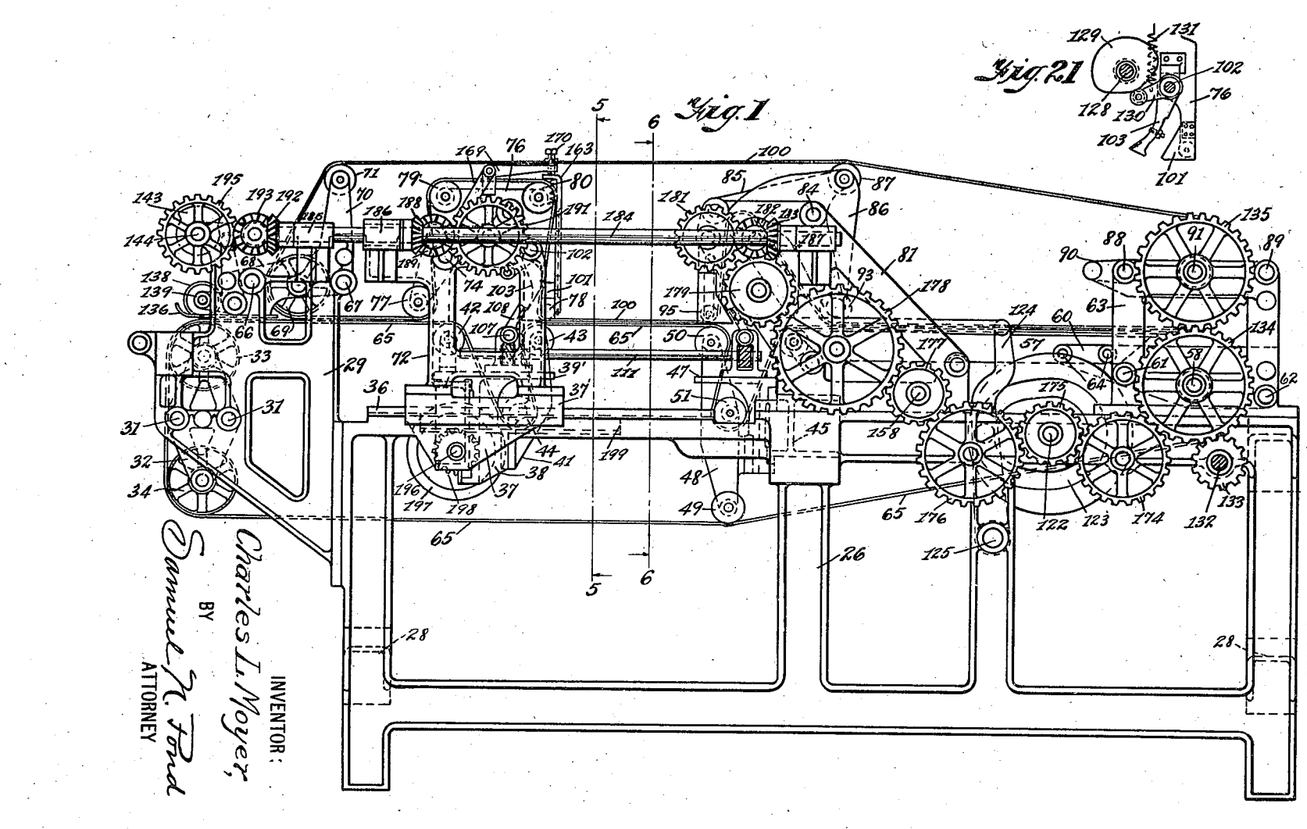
Fig. 1 is a side elevation of the machine.
Fig. 21 is a detail side elevation of one of the upper die members, showing its hinged wall and the mechanism for swinging the latter into and out of working position.
Figure 2:
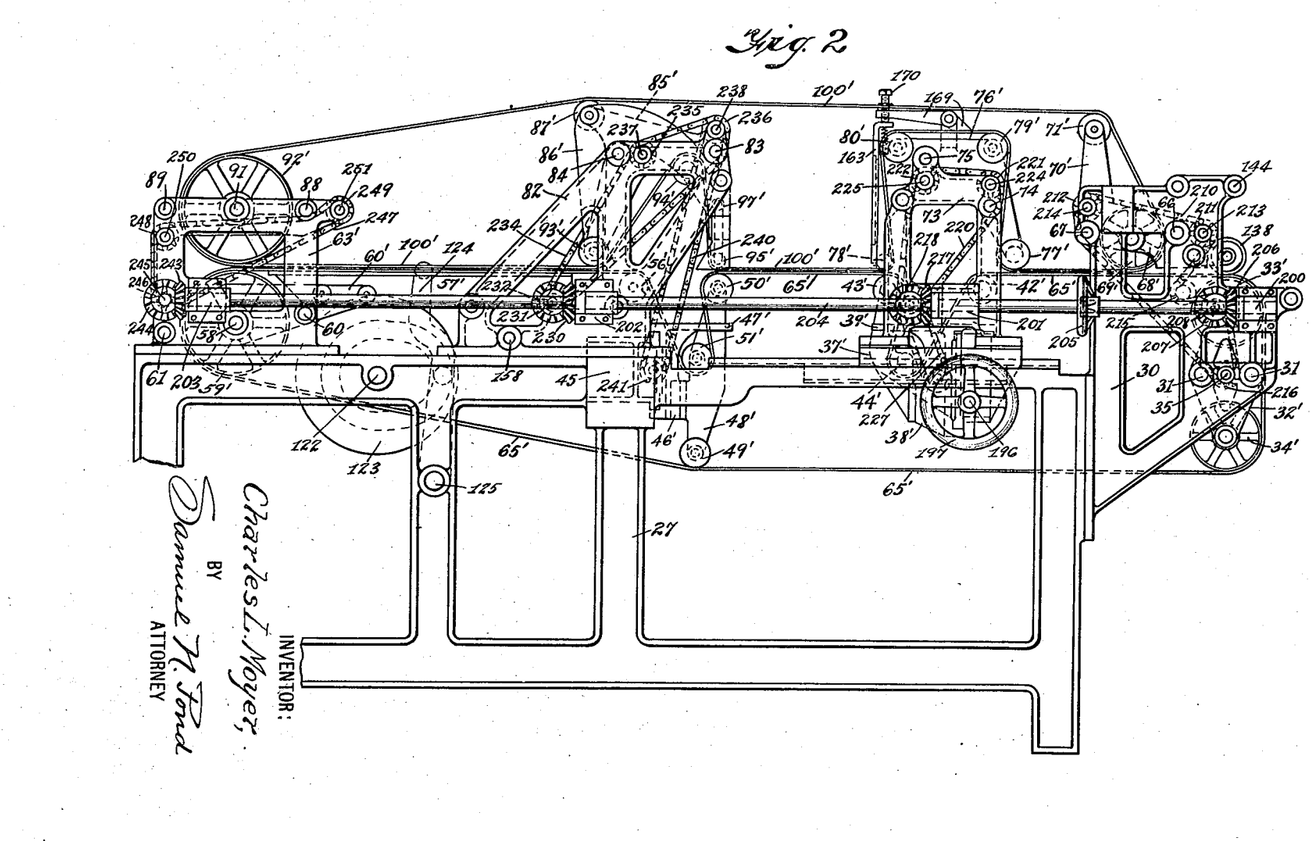
Fig. 2 is a side elevation viewed from the side opposite that shown in Fig. 1.
Figures 3, 15, 16, 19, 20:
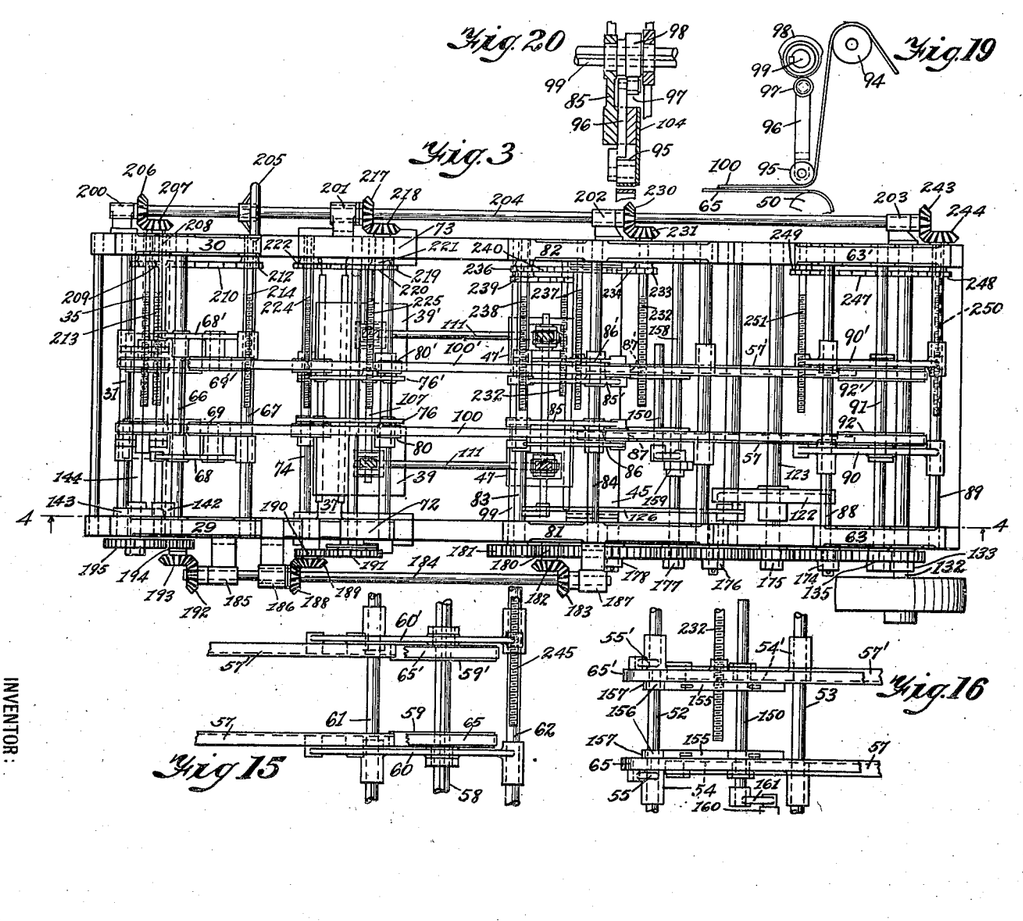
Fig. 3 is a top plan view, looking down on Fig. 1.
Fig. 15 is a detail plan view of the rear lower belt supporting pulleys and their adjusting mechanism.
Fig. 16 is a detail plan view of the blank arresting mechanism and its adjusting means.
Figs. 19 and 20 are views in side elevation and vertical section, respectively, of the mechanism which causes the belts to grip the blank and pass it on beyond the folding devices at the conclusion of the operation of the latter.
Figures 4, 17, 18:
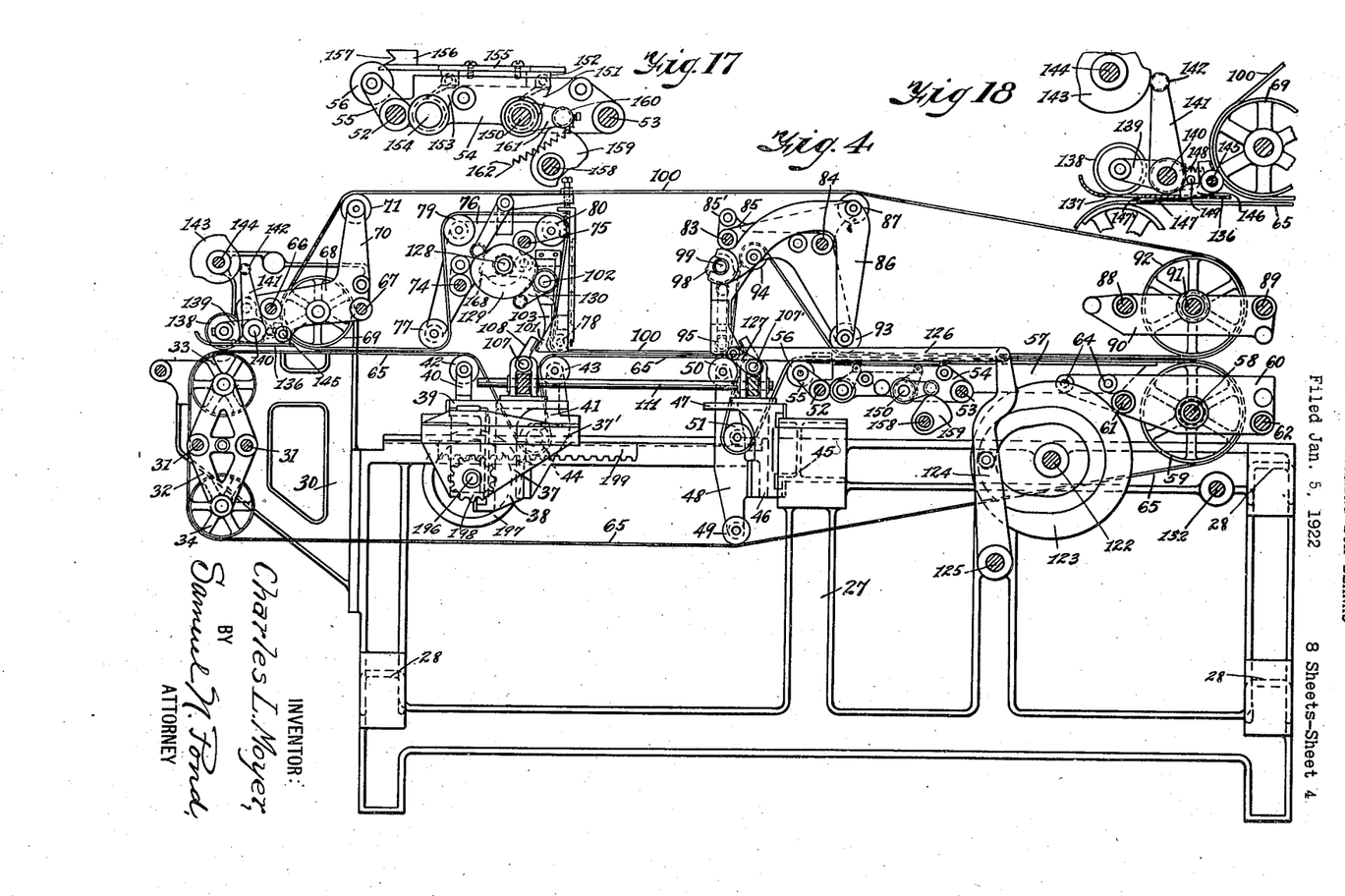
Fig. 4 is a longitudinal vertical section substantially on the line 4—4 of Fig. 3, and slightly enlarged.
Fig. 17 is a detail side elevation of the blank arresting mechanism shown in Fig. 16 as viewed from the bottom of the latter figure.
Fig. 18 is an enlarged side elevation, partly in vertical section, of the automatic feed device controlling the admission of the blanks to the conveyor belts of the machine, and showing the mechanism in the stop position.

Referring to Figs. 1, 4 and 15, the shaft 58 is supported by a pair of sleeved brackets 60 and 60' that are in turn mounted and supported on parallel rods 61 and 62, these latter in turn being mounted in and between a pair of auxiliary side frames 63, 63' (Figs. 1 and 2). The brackets 60 and 60' are bolted or riveted to the rear ends of the angle bars 57, 57', as indicated at 64 in Fig. 4, and the bracket 60 is stationary, while the companion bracket 60' in which the hub of belt pulley 59' is journaled, is laterally shiftable.

Trained over and guided and supported by the several pulleys and rollers above described and located, are a pair of lower endless conveyor belts 65 and 65'; and it will here be noted that all the supporting and guiding devices of the belt 65' are simultaneously shiftable laterally relatively to the guiding and supporting devices of the belt 65, so that the distance between said belts can be varied to handle blanks of varying widths.

Cooperating with these two lower endless belts 65, 65' are a pair of upper endless belts located in the same vertical planes as the lower belts, and the supporting, guiding and driving devices of these upper belts will next be described.

Supported on and between the upper portions of the extension frames 29 and 30 are a pair of parallel rods 66 and 67, on which are mounted yokes 68, 68', the former being fixed on said rods and the latter slidable thereon. Journaled on the yokes 68 and 68' are pulleys 69, 69'. The yokes 68, 68' are formed with upwardly extending arms 70, 70', in the upper ends of which are journaled belt pulleys 71, 71'.

The longitudinally adjustable carriage hereinbefore referred to as slidably mounted on the rails 36 includes a pair of side frame members 72 and 73 rigidly spaced and connected by parallel rods 74 and 75. Mounted on these rods are fixed and slidable yokes 76, 76'. On the lower ends of the yoke 76 are journaled rollers 77, 78, and above and vertically offset from these rollers are additional rollers 79, 80. Journaled on the yokes 76' are similar rollers 77', 78', 79' and 80'.

Mounted on the upper edges of the main side frames 26 and 27 toward the rear end of the machine are a pair of skeleton frame members 81 and 82 rigidly connected and spaced by parallel tie-rods 83, 84. On these tie-rods are mounted a pair of yokes 85, 85', and on the outer sides of, and lying parallel with said yokes, are a pair of auxiliary yokes 86, 86'. Journaled in and between the yokes 85 and 86 is a roller 87 and journaled in and between the yokes 85′ and 86′ is a corresponding roller 87′. Mounted on a pair of tie-rods 88 and 89 supported by the auxiliary frames 63, 63′ are a pair of yokes 90 and 90′ (Fig. 3), the former being fixed on said rods and the latter slidable thereon. Journaled in the auxiliary side frames 63, 63′ and extending through the yokes 90, 90′ is a drive-shaft 91, and splined on said shaft and also rotatably coupled to the yokes 90, 90′ are a pair of pulleys 92, 92′.

Journaled in and between the lower ends of yokes 85 and 86 is a guide pulley 93 (Fig. 4), and similarly journaled in and between the lower ends of the yokes 86′ and 85′ is a corresponding pulley 93′ (Fig. 2). Journaled in and between the yokes 86 and 85 is an upwardly offset pulley 94, and similarly journaled in and between the yokes 86′ and 85′ is an upwardly offset pulley 94′. Referring to Figs. 4, 6, 19 and 20, 95 designates a roller journaled in the lower end of a vertically reciprocable bar 96 slidably mounted and guided in one limb of the yoke 85, the bar 96 at its upper end carrying a cam roller 97 engaged by a cam 98 keyed on a cam shaft 99. A similar equipment comprising roller 95′, reciprocable bar 96′, cam roller 97′ and cam 98′ is mounted on the laterally shiftable yoke 85′, as clearly shown in Fig. 6.

Trained over the guiding, supporting and driving pulleys last described are a pair of upper endless belts 100, 100′, the lower laps of which lie contiguous with the upper laps of the lower belts 65 and 65′ except for the vertically offset portions of said lower and upper belts, the purpose of thus offsetting the belts at these points being to accomodate the operation of the blank bending and folding mechanism.

Figure 5:
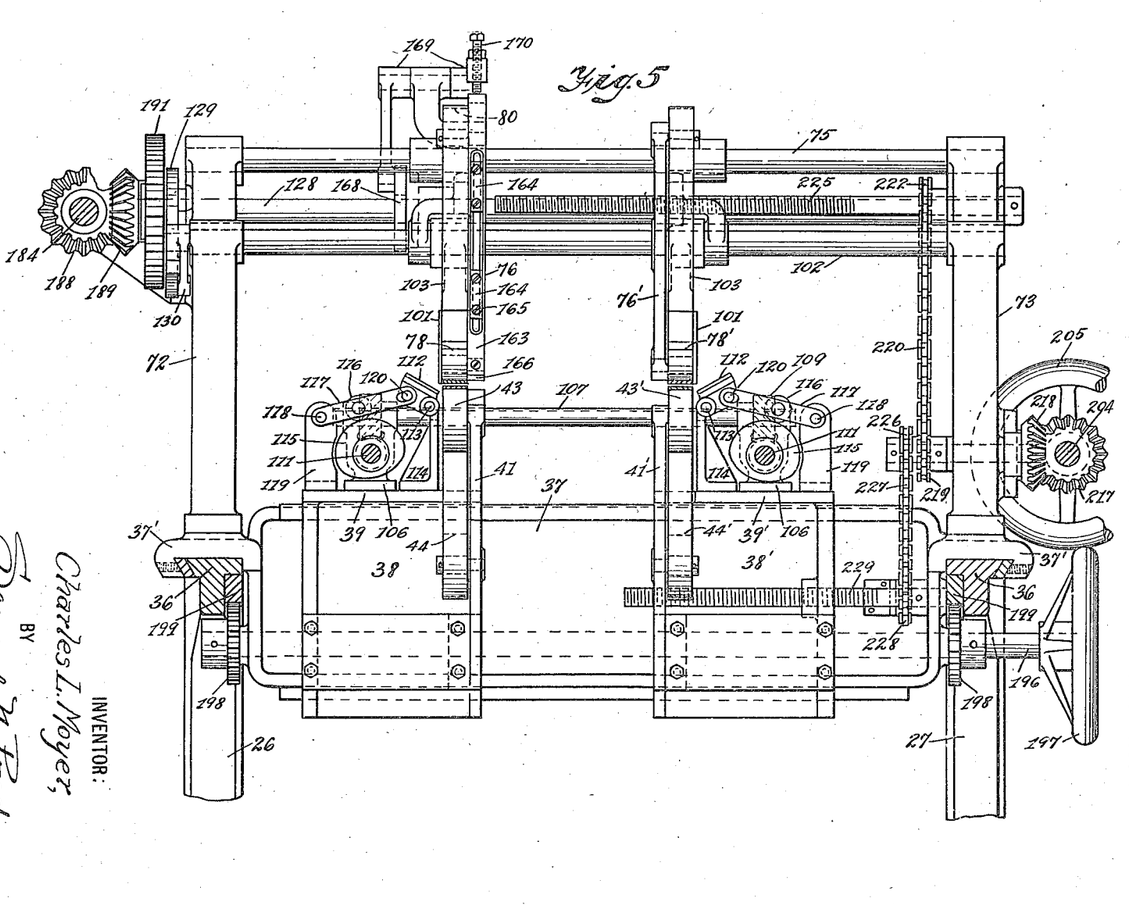
Figure 5 is an enlarged vertical cross-section taken on the line 5—5 of Fig. 1.
Figure 6:
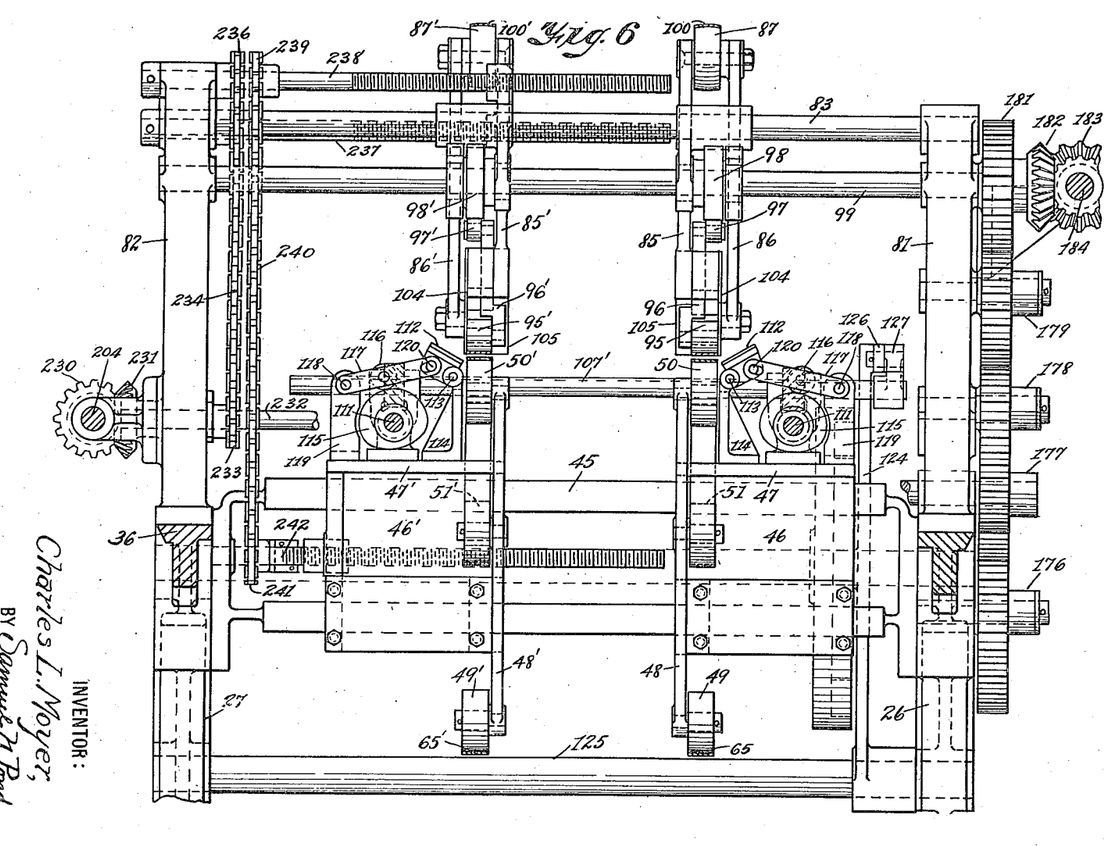
Fig. 6 is an enlarged vertical cross-section taken on the line 6—6 of Fig. 1.
Figure 7:
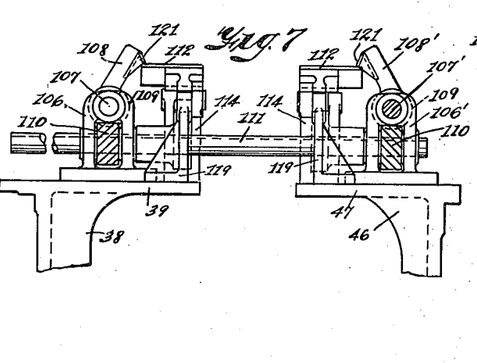
Fig. 7 is a detail view, showing in side elevation two front and rear pairs of blank folding devices.
Figures 8, 11:
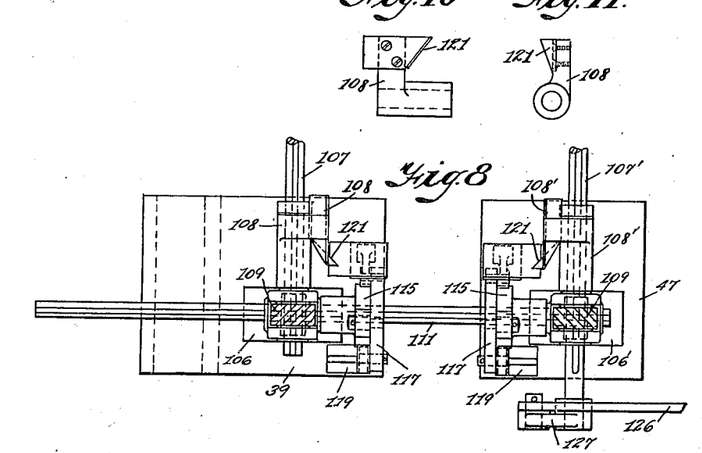
Figure 9:
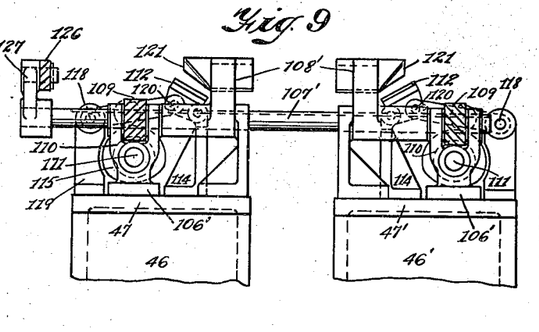
Fig. 9 is a view in side elevation of the two pairs of rear blank folding devices.

Referring next to this blank bending and folding mechanism, which is best illustrated in the sectional views Figs. 5 and 6 and the detail views Figs. 7 to 11 and Fig. 21, the rear lower limbs of the yokes 76, 76′ have attached thereto on their outer sides plates 101, forming the outer sides of a pair of stationary dies or formers. Hinged on a rod 102 extending between the auxiliary frames 72 and 73 are a pair of swinging shoes 103, most clearly shown in Fig. 21, which constitutes the front walls of said dies. Similarly, on the depending inner limbs of the yokes 85 and 85′ are attached side and rear die plates 104 and 105, respectively (Fig. 6) which together form the rear pair of stationary dies or formers.

Cooperating with these stationary dies or formers are hinged longitudinal and transverse blank bending and folding devices, there being a pair of such cooperating devices at each corner, one member of the pair acting to bend the end wall of the blank up and inwardly approximately thirty degrees beyond the perpendicular, while the other at the same time bends the side wall up approximately thirty degrees above the horizontal; and one of these benders or folders carries the oblique blade that initially breaks the corner section of the blank on an oblique or diagonal line.

Mounted on the platforms 39, 39′ (Fig. 5) are skeleton bearing brackets 106 in and between the upper ends of which is journaled a transverse shaft 107. Keyed on this shaft are a pair of folder blades 108 that operate upon the end portions of the rear ends of a blank. Mounted on the tables 47, 47′ are a similar pair of skeleton bearing brackets 106′, in and between the upper ends of which is journaled at shaft 107′ carrying similar folder blades 108′ that operate upon the end portions of the forward end wall of a blank. On the shafts 107, 107′ are spiral gears 109, meshing with similar gears 110 that are splined on a drive-shaft 111 journaled in and between the lower portions of the bearing brackets 106, 106′.

Referring to Fig. 5, 112 designates side folders blades, of which there are a pair on each side of the machine, each of these blades being hinged at 113 to supporting brackets 114 mounted on the blocks 38, 38′ and 46, 46′. The blades 112 are actuated from cams 115 splined on the shaft 111 and cooperating with cam rollers 116 mounted on levers 117 that are hinged at 118 to brackets 119 on the tables 39, 39′ and 47, 47′, the other ends of said levers being slotted and engaging pins 120 in the folder blades 112.

To insure the inward breaking and folding of the corner section, as the end and side walls are bent upwardly, one of the two cooperating folder blades at each corner is equipped with a corner breaking blade. In this instance I have shown the end folder blades 108, 108′ as carrying obliquely disposed triangular extensions 121 each having a forwardly and outwardly inclined free edge that substantially bisects the angle between said blades and, as the two blades swing upwardly, lifts and bends the corner section between them, breaking said section sufficiently to make it fold flat in condition for subsequent stitching to the end wall.

Referring next to the drive mechanism for the folder blades, 122 (Fig. 4) designates a transverse cam shaft on which is mounted a grooved cam 123 that reciprocates a lever 124 pivoted at 125 to the frame 27 and connected at its upper end by a link 126 to an arm 127 on one end of the rock shaft 107′ (Fig. 6). The folder blades at the front corners are actuated simultaneously with the folder blades at the rear corners through the shafts 111 through which the movement is transmitted from shaft 107'.

Referring once more to the upper stationary formers 101, the purpose of the swinging wall or shoe 103 of the pair nearest the receiving end of the machine is to allow the front ends of the blanks to readily enter the field of operation of the bending and folding mechanism without interference on account of the advanced end of the blank bending or swinging upwardly as it approaches the formers. Fig. 21 illustrates in detail a spring and cam actuated mechanism for controlling the movement of the hinged die plate or shoe 103. On a cam shaft 128 is mounted a cam 129 acting upon an arm 130 fast on the shaft 102 to which the swinging wall 103 is splined. A spring 131 pulls the shoe upwardly, while the cam 129 forces it downwardly to substantially vertical position just after the blank has reached a position to be operated on and just before the folder blades 108 swing inwardly on their working stroke.

The two series of belts are positively driven from a drive shaft 132 (Fig. 1), a gear 133 on said drive shaft, and gears 134 and 135 fast on the shafts 58 and 91, respectively.

At the blank receiving end of the machine are located a pair of automatic devices for controlling the passage of the blanks into the machine in properly timed succession, this mechanism being most clearly shown in Figs. 4 and 18. These two devices cooperate with the fixed and laterally adjustable pairs of belts respectively and as they are structurally identical, a description of one will suffice for both. To the lower forward surface of the yokes 68, 68' are secured flat plates 136 having upwardly turned forward ends lying just above the lower conveyor belts 65, 65'. This plate has a slot 137, through which extends the lower periphery of a friction feed roller 138 journaled in an arm 139 that is fast on a rock shaft 140 mounted in and between the frame members 29 and 30. On one end of this rock shaft is an upstanding arm 141 carrying at its upper end a roller 142 engaged with a cam 143 fast on a cam shaft 144. Also mounted on a pivot stud 145 in each of the yokes 68, 68' is a block 146 lying just outside the upper lap of the lower feed belt, said block 146 having attached thereto a stop finger 147 with an upturned end 147'. Between the upper side of the block 146 and the hub of the roller arm 139 is interposed a compression spring 148. On a rearward extension of the arm 139 is a pin 149 that operates on the upper edge of the block 146 in front of the pivot of the latter.

With the parts in the position shown in Fig. 18, the cam 143 has raised roller 138 out of blank feeding position, and the pin 149 acting on the block 146 has depressed the stop finger 147 so that its bent end 147' closes the passage between the conveyor belt and the plate 136. This happens immediately after each blank has passed into the receiving end of the machine. At the proper interval of time when the machine is ready to handle another blank, the cam 143 releases the roller 138 and permits it to drop into frictional engagement with the lower conveyor belt, and at the same time the pin 149 is raised and the spring 148 throws the stop finger 147 upwardly to clear the throat of the machine and allow the next blank to enter. By means of this automatic mechanism the blanks are allowed to enter the machine only as fast as they are handled by the bending and folding mechanism, thus rendering it unnecessary to depend upon the judgment and skill of the operative to avoid overcrowding of the machine.

Just beyond the bending and folding mechanism is located an automatic mechanism for arresting the blank the instant it has reached a position between the bending and folding devices to be operated upon by the latter, which mechanism is best shown in the detail views Figs. 16 and 17, and, like the feed control mechanism, comprises a pair of duplicate assemblies, one of which is fixed and is associated with the fixed conveyor belts, while the other is laterally adjustable and is associated with the laterally adjustable conveyor belts. Extending between the yokes or bars 54, 54' is a rock shaft 150 on which is an upstanding arm 151 pivotally connected at its upper end to a link 152, the other end of said link being similarly connected to a companion arm 153 pivoted at 154 in each of the yokes 54, 54'. Attached to the link 152 is a strip 155 which, as shown in Fig. 16, lies just inwardly of the upper lap of each of the lower conveyor belts just in rear of the bending and folding mechanism. On the inner end of the strip 155 is mounted a block 156 formed with a V-shaped front end 157 which, when the strip 155 is in the position shown in Figs. 4 and 17, lies directly across the path of travel of the blank. Extending between the main side frame members is a cam shaft 158 carrying a cam 159 that cooperates with a roller 160 on an arm 161 keyed to the rock shaft 150. Also connected to the arm 161 is a pull spring 162 by which the roller 160 is held in engagement with the cam 159. By the last described mechanism the stops 156 are alternately raised and lowered above and below the plane of the lower conveyor belts, said stops rising to operative position the instant a formed blank has passed on beyond them and arresting the travel of the next blank for the instant required to form the same by the bending and folding devices, and then withdrawing below the plane of the belts to allow the blank to pass on and out of the machine.

Figures 12, 13, 14:
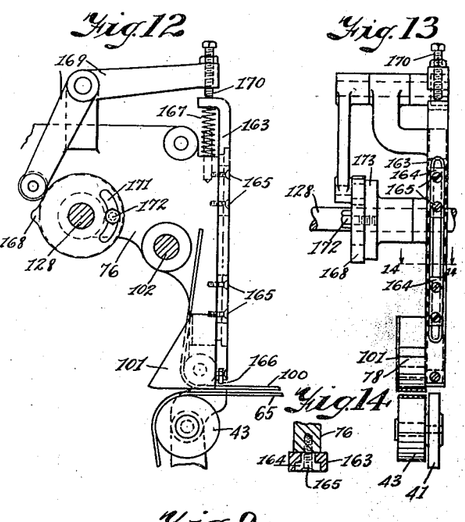
Figs. 12 and 13 are detail views showing in side and front elevation, respectively, a slow-down mechanism for retarding the travel of the blank just before its travel is arrested preliminary to the bending operation.
Fig. 14 is a cross-sectional detail on the line 14—14 of Fig. 13.

The sudden arrest of the blank by the stop mechanism last described has a tendency to cause the forward end of the blank to bend upwardly and sometimes jump over the stops. To prevent this I preferably employ what I term a slow down mechanism, the same being a mechanism in the general nature of a brake to apply a light drag to the blank just before it engages with the stop devices. This mechanism is best shown in Fig. 5 and in the detail views Figs. 12 and 13, and comprises a vertically reciprocable slotted presser bar 163 that is slidably mounted on a pair of guide blocks 164 which latter are attached to the rear depending limb of the yoke 76, by screws 165; the lower end of said presser bar having a foot piece 166 of rubber or similar friction material. The presser bar is urged upwardly by a compression spring 167, and is forced downwardly onto the blank just before the latter reaches the stop mechanism by a cam 168 mounted on a cam shaft 128 and operating a lever 169, the bar engaging end of said lever being provided with an adjusting screw 170. The cam 168 is adjustable by means of an arcuate slot 171 formed therein, and a clamp nut 172 passed through said slot and into a boss 173 keyed on the shaft 128.

The function of the belt rollers 95, 95' shown in Figs. 6, 19 and 20 and hereinbefore described is not alone that of belt guides and supports, but said rollers, being vertically reciprocable as described, also constitute a belt controlling mechanism located and operating between the front and rear pairs of blank bending and folding devices which intermits the group of the belts on the blank the instant the latter is positioned and arrested, and immediately after the oscillating blank bending and folding devices have withdrawn restores the grip of the belts on the blank so as to carry the latter out of the field of the blank forming mechanism. The cams 98, 98' are so timed that when the blank is first received and arrested by the stops 156, and while the forming devices are operating thereon, said cams are making the idle portion of their travel, at which time the grip of the belts between the front and rear pairs of forming devices is just sufficient to carry the blank up to the stops under the drag of the slow down mechanism, the belts thereafter and during the forming operation slipping over the blank. The instant the operation is performed and the stops withdrawn, the cams 98, 98' cause the rollers 95, 95' to pinch the belts on the blank and thereby carry the latter on beyond the forming mechanism and again into the grip of the belts.

Referring next to the transmission mechanism which is shown mainly in Figs. 1 and 3, meshing with the gear 134 is an idler gear 174 driving a gear 175 fast on cam shaft 122, from which latter the oscillating bending and folding devices are actuated, as already described. From gear 175 power is transmitted through an idler gear 176 to a gear 177 fast on the cam shaft 158 which actuates the stop mechanism. From the gear 177 the power is transmitted through idler gears 178 and 179 to a gear 180 (Fig. 3) journaled on the side frame 81, gear 180 driving cam shaft 99 through a gear 181 on the latter shaft. Rigid with gear 180 is a mitre gear 182 driving a mitre gear 183 keyed on a way shaft 184, this latter being journaled in bearings 185, 186 and 187. In the bearing 186 is mounted the hub of a mitre gear 188 that is splined on shaft 184 and drives a mitre gear 189 journaled in the carriage frame 72. Fast on the hub of mitre gear 189 is a spur gear 190 that drives a spur gear 191 fast on the cam shaft 128, by which both of the cams 129 and 168 are operated. Keyed on the forward end of the way-shaft 184 is a mitre gear 192 driving a mitre gear 193 journaled in the side frame 29. Fast on the hub of mitre gear 193 is a spur gear 194 meshing with and driving a spur gear 195 fast on the cam shaft 144, by which the cam 143 controlling the feed mechanism is driven.

The carriage 37 hereinbefore described as carrying the forward pair of blank forming devices and the forward groups of belt supports and guides is slidable lengthwise of the machine on the rails 36, and is manually shiftable by means of a cross shaft 196 (Fig. 5) journaled in the carriage and carrying on one end thereof a hand wheel 197. Fast on the shaft 196 are pinions 198 which mesh with racks 199 secured to the side frames 26 and 27.

It now remains to describe the mechanism by which the conveyor belts and their guiding, supporting and driving devices on one side of the machine, and one pair of front and rear folding devices on the same side are bodily shiftable laterally of the machine in order to make the latter adaptable to blanks of varying widths. Referring to Fig. 2, on the left side of the machine, viewing from the front, is journaled in bearing brackets 200, 201, 202 and 203 a horizontal shaft 204, fast on which is a hand wheel 205. Keyed on the forward end of the shaft 204 is a mitre gear 206 driving a mitre gear 207 on a stub shaft 208 journaled in the frame member 30. On the inner end of the stub shaft 208 is a sprocket wheel 209 driving a sprocket chain 210. This chain passes over sprockets 211 and 212 fast on long screws 213, 214, respectively (Fig. 3) that are journaled in the side frame member 30 and extend through tapped holes in the yoke 68'. The same sprocket chain 210 extends over an idler roller 215 between the sprockets 211 and 209, and from the latter it extends down and around a sprocket 216 fast on the long screw 35 which is threaded through the lower yoke member 32'.

Splined on the shaft 204 is an intermediate mitre gear 217 that drives a mitre gear 218 journaled in the carriage frame member 73. Fast on the shaft of the mitre gear 218 is a sprocket wheel 219 (Fig. 5) engaged with a sprocket chain 220 that passes upwardly over a pair of sprockets 221 and 222 journaled in the upper portion of the frame member 73 and fast on a pair of long screws 224 and 225, respectively, that are engaged with tapped holes in the laterally adjustable yoke 76'. Also fast on the shaft of the mitre gear 218 is a sprocket 226 (Fig. 5) driving a sprocket chain 227 which passes downwardly around a sprocket 228 that is fast on a long screw 229 that engages a tapped hole in the laterally shiftable folder supporting block 38'. Further along on the shaft 204 is a mitre gear 230 (Figs. 2 and 6) driving a mitre gear 231 fast on a long screw 232 (Figs. 3 and 16) that is threaded through the yoke bar 54' carrying the shiftable half of the blank arresting mechanism and the belt guide pulley 65'. A sprocket wheel 233 on the screw 232 drives a sprocket chain 234 which, as shown in Figs. 2 and 3, extends upwardly and over a pair of sprockets 235 and 236 fast on long screws 237 and 238, respectively, that are threaded through the adjustable yoke plate 86' and passed through clearance holes in the adjustable yoke plate 85'. Fast on the screw 238 is a sprocket 239 from which a chain 240 extends downwardly to and around a sprocket 241 (Fig. 6) that is fast on a screw 242 that is threaded into the adjustable folder supporting block 46'.

Fast on the rear end of the long shaft 204 is a mitre gear 243 meshing with and driving a mitre gear 244, fast on a long screw 245 (Fig. 15) that is threaded through the shiftable yoke 60' supporting the lower drive pulley 59' of the lower belt 65'. Fast on the screw 245 is a sprocket 246 driving a sprocket chain 247 that extends upwardly and around a pair of sprockets 248 and 249 fast on long screws 250, 251, respectively that are threaded through the adjustable yoke member 90' supporting the drive pulley 92' for the upper belt 100'.

The operation of the machine has been quite fully indicated in connection with the foregoing description of its structural parts and organization, but may be briefly outlined as follows:

While the machine is capable of breaking and folding the corners of any form or type of rectangular blank, in Figs. 22 to 25 inclusive I have illustrated a typical form of blank and the shape into which it is bent and folded by the present machine. In these views A designates the body of the blank, B the side walls thereof joined to the body by scored lines C, and D the end walls joined to the body by scored lines E, and F the four corners joined to the side walls B by scored lines G and to the end walls by scored lines H. The end walls D have extension flaps I connected thereto by scored lines K. The blanks are fed flat and one end foremost in succession into the grip of the conveyor belts, being timed by the automatic feed regulators. As the forward edge of the blank approaches the front pair of folding devices the hinged die walls 103 swing upwardly to the position shown in Fig. 21, allowing the flap I to pass freely between the upper dies and the lower folders which, at this time, are in their lowermost positions. The frictional grip of that portion of the conveyor belts between the front and rear folding devices is sufficient to carry the blank onwardly, the latter being retarded by the slow down mechanism pressing on its upper surface. As soon as the forward edge of the foremost flap I strikes the stops 156, which at this time are in raised position, the travel of the blank is arrested for an instant, while the oscillating hinged end folders 108, 108' and the side folders 112 swing upwardly and bend and fold the blank temporarily into substantially the shape shown in Figs. 23, 24 and 25. During this operation, the oblique extensions 121 of the folder blades 108 and 108' engaging beneath the corners F further break and fold the latter each on itself, along the oblique scored line indicated at L. The instant the pivoted folders have retreated, the stops 156 also are retracted, and the cam 98 forces the roller 95 downwardly pinching the two belt sections together on the top of the blank so that the latter is again carried forwardly out of the zone of action of the folding devices. The upwardly and inwardly bent forward end flap I and end wall D, when released, spring back to a position slightly upwardly inclined from the horizontal and striking the downwardly inclined section of the upper belts 100, 100', just in advance of the rollers 93, 93', are flattened down again so that the blank is carried on through and out of the machine.

With further reference to the operation of the swinging die walls or shoes 103, it may be noted that as soon as the forward edge of the blank has passed the forward die shoes 101, the walls 103 are swung downwardly to substantially vertical position by the cam 129 and held in such position during the forming operation, the cam permitting the said walls to swing upwardly again just before the next blank arrives beneath the latter.

The machine is adjusted to handle longer or shorter blanks by turning the hand wheel 197 in one direction or the other, this, through the pinions 198 and racks 199, shifting the carriage carrying the front dies and holding devices and belt supporting and guiding devices bodily toward or from the front or blank receiving end of the machine, and thus adjusting the space between the front and rear pairs of forming devices according to the length of the particular blanks to be run through the machine. The machine is adjusted to handle wider or narrower blanks by simply turning the hand wheel 205 in one direction or the other, which, through the turning of the several long screws, effects a bodily shift of all the forming devices and belts and belt supporting devices on the left side of the machine toward or from the corresponding devices on the right side of the machine, thereby adjusting the space between the front and rear pairs of forming devices on the left side and the corresponding pairs on the right side according to the width of the particular blanks to be run through the machine. It will thus be seen that of the four pairs of cooperating dies and folders operating respectively upon the four corners of the blank, one of them is stationary, one is shiftable widthwise of the machine, a third is shiftable lengthwise of the machine, and a fourth is shiftable both widthwise and lengthwise.

The chief function of the present machine in operating upon blanks of this character is to break the corners F obliquely so that they will readily fold upon themselves in the subsequent operations of setting up and stitching the box, the folded corners lying against the inner surface of the end walls D. The machine also, by bending the side and end walls B and D on the scored lines C and E respectively increases the flexibility of these joints so that said walls, in the subsequent setting up of the box, are easily brought into planes at right angles to the body wall A. The complete setting up of the box body from a blank of this form is effectuated later by bending the side and end walls upwardly, bending the folded corners against the inner sides of the end walls and stitching them to the latter, and then bending the end flaps I inwardly and catching their ends between the two walls of the folded corners, but these operations may be performed either by hand or by a further mechanism receiving the prepared blanks directly from the present machine.

I am aware that machines for folding and bending cardboard blanks of varying forms have heretofore been known, but so far as I am aware my present machine is broadly new in the provision of devices comprising a stationary die member and oscillating folders rectangularly disposed and operating upon the four corners of a blank by which the side and end walls are preliminarily bent and folded along lines connecting them with the body of the blank and the corners of the latter connecting the side and end walls are obliquely broken preliminary to being folded against the inner side of the end or side walls. Manifestly the machine as herein shown and described may be variously modified in respect to details of structure and organization without involving departure from the principal of operation, and without sacrificing any of the advantages of the invention. A number of the features of the present machine are disclosed and claimed in the same or similar forms in my earlier application hereinbefore identified; but the machine of the present invention is differentiated mainly from the machine of the aforesaid application in the substitution of hinged oscillating wings or blades cooperating with stationary die members for folding and breaking the end, side and corner walls of the blanks in lieu of vertically reciprocating female die members; and I have herein claimed such novel features and combinations as are believed to be new and original in broad terms, and I reserve all such variations, modifications and mechanism equivalents as fall within the spirit and purview of the appended claims.

I claim:

1. In a blank folding machine of the character specified, the combination with a frame, of mechanism including swinging folding devices mounted thereon for bending and breaking the corners of the blank, means for conveying a blank into the field of operation of said bending and breaking mechanism, means for arresting the travel of the blank while said mechanism is operating thereon, and means for discharging the blank from the field of operation of said mechanism.

2. In a blank folding machine of the character specified, the combination with a frame, of mechanism including swinging folding devices mounted thereon for bending and breaking the corners of the blank, upper and lower belts for conveying the blank to and beyond the field of operation of said bending and breaking mechanism, and means for arresting the travel of the blank while said mechanism is operating thereon.

3. In a blank folding machine of the character described, the combination with a frame, of four pairs of corner bending and breaking devices mounted thereon, each pair comprising a stationary die member and hinged folder blades mounted to swing toward and from said die member, upper and lower belts between the contiguous laps of which the blank is carried beneath said die members, and means for arresting the travel of the blank while said folder blades are operating thereon.

4. In a blank folding machine of the character described, the combination with a frame, of four pairs of corner bending and breaking devices mounted thereon, each pair comprising a stationary die member and hinged folder blades mounted to swing toward and from said member, upper and lower belts between the contiguous laps of which the blank is carried beneath said die members, the blank-engaging portions of said belts being offset on opposite sides of the path of travel of the blank in the regions occupied by said die members and folder blades, and means for arresting the travel of the blank while said folder blades are operating thereon.

5. In a blank folding machine of the character described, the combination with blank conveying mechanism, of corner bending and breaking devices comprising upper stationary die members and lower vertically swinging folder blades between which die members and folder blades the blank is passed and operated upon, said die members having walls that are movable upwardly to allow the blank to pass without interference to a position between said die members and folder blades.

6. In a blank folding machine of the character described, the combination with blank conveying mechanism, of corner bending and breaking devices comprising upper stationary die members and lower vertically swinging folder blades between which die members and folder blades the blank is passed and operated upon, said die members having front walls hinged at their upper ends, and means for swinging the lower ends of said walls upwardly and outwardly as the forward edge of the blank passes beneath them.

7. In a mechanism for folding box blanks, the combination of a die member having walls at a right angle to each other, a pair of horizontally hinged folder blades disposed at a right angle to each other and operating on their inward swinging movements to bend the end and side walls of the blank toward the corresponding walls of said die member, and an extension blade carried by one of said folder blades having a forwardly and outwardly inclined free edge substantially bisecting the angle between said blades and operating to obliquely break the corner portion of said blank.

8. In a mechanism for folding rectangular box blanks, the combination of four upper die members for operating on the corners of the blank, a corresponding group of pivoted folder blades for bending the side walls of the blank toward said die members, and cam actuated means for simultaneously actuating said folder blades.

9. In a mechanism for folding rectangular box blanks, the combination of four upper die members for operating on the corners of the blank, a corresponding group of folder blades for folding the end walls of the blank against said die members, a pair of transverse rock-shafts located below the front and rear pairs of die members respectively on which said folder blades are mounted, cam actuated means for oscillating one of said rock-shafts, and connections between said rock-shafts through which simultaneous and equal oscillation is imparted to the other rock-shaft.

10. In a mechanism for folding rectangular box blanks, the combination of four upper die members for operating on the corners of the blank, a corresponding group of pivoted folder blades for bending the side walls of the blank toward said die members, a pair of longitudinal rock-shafts below and on opposite sides of said die members respectively, cams on said rock-shafts, and means actuated by said cams for swinging said folder blades toward said die members.

11. In a mechanism for folding rectangular box blanks, the combination of four upper die members for operating on the corners of the blank, a corresponding group of pivoted folder blades for bending the side walls of the blank toward said die members, a pair of longitudinal rock-shafts below and on opposite sides of said die members respectively, cams on said rock-shafts, and levers articulated to said folder blades and actuated by said cams.

12. In a mechanism for folding rectangular box blanks, the combination of four upper die members for operating on the corners of the blank, a corresponding group of folder blades for folding the end walls of the blank against said die members, a pair of transverse rock-shafts located below the front and rear pairs of die members respectively on which said folder blades are mounted, a corresponding group of pivoted folder blades disposed at right angles to first named folder blades for bending the side walls of the blank toward said die members, a pair of longitudinal rock-shafts below and on opposite sides of said die members respectively, cams on said longitudinal rock-shafts, means actuated by said cams for swinging said last named folder blades toward said die members, gearing connecting said transverse and longitudinal rock-shafts, and mechanism for rocking one of said rock-shafts.

13. In a blank folding machine of the character described, the combination with a frame, of blank bending mechanism mounted thereon, means for conveying a blank into and beyond the field of operation of said blank bending mechanism, a stop mechanism engaging the forward edge of the blank as the latter reaches a position to be operated on by said bending mechanism, and means for slowing down the travel of the blank before it strikes said stop mechanism.

14. In a blank folding machine of the character described, the combination with a frame, of blank bending mechanism mounted thereon, means for conveying a blank into and beyond the field of operation of said blank bending mechanism, a stop mechanism engaging the forward edge of the blank as the latter reaches a position to be operated on by said bending mechanism, a friction brake, and means for applying said brake to the surface of the blank before the latter strikes said stop mechanism.

15. In a blank folding machine of the character described, the combination with a frame, of blank bending mechanism mounted thereon, means for conveying a blank into and beyond the field of operation of said blank-bending mechanism, a stop mechanism engaging the forward edge of the blank as the latter reaches a position to be operated on by said bending mechanism, a vertically reciprocable brake bar having a friction brake shoe on its lower end, a spring normally upholding said brake bar, and cam actuated means for depressing said brake shoe onto the surface of the blank before the latter strikes said stop mechanism.

16. In a blank folding machine of the character described, the combination of a frame, front and rear blank folding mechanisms mounted on said frame for operating on the ends of the blank respectively, each of said folding mechanisms including a die member and hinged folder blades adapted to swing toward and from said die member, means for conveying blanks into the field of operation of said folding mechanisms, and means for adjusting one of said folding mechanisms toward and from the other whereby to adapt said mechanisms to handle blanks of different lengths.

17. In a blank folding machine of the character described, the combination of a frame, a carriage slidably mounted on said frame, a blank folding mechanism mounted on said frame for operating on one end of a blank, a similar blank folding mechanism mounted on said carriage for operating on the other end of said blank, each of said folding mechanisms including a die member and hinged folder blades adapted to swing toward and from said die member, means for conveying blanks into the field of operation of said folding mechanisms, and means for shifting said carriage lengthwise of said frame whereby to adapt said folding mechanisms to handle blanks of different lengths.

18. In a blank folding machine of the character described, the combination of a frame, a carriage slidably mounted on said frame, a pair of blank folding devices mounted on said frame for bending and breaking the front corners of a blank, a similar pair of blank folding devices mounted on said carriage for bending and breaking the rear corners of the blank, each of said folding devices comprising a die member and a pair of rectangularly disposed hinged folder blades adapted to swing toward and from the sides of said die members, means for conveying blanks into the field of operation of said folding devices, and means for shifting said carriage lengthwise of said frame.

19. In a blank folding machine of the character described, the combination of a frame, right and left blank folding mechanisms mounted on said frame for operating on the sides of a blank respectively, each of said folding mechanisms including a die member and hinged folder blades adapted to swing toward and from said die member, means for conveying blanks into the field of operation of said folding mechanisms, and means for adjusting one of said mechanisms toward and from the other whereby to adapt said mechanisms to handle blanks of different widths.

20. In a blank folding machine of the character described, the combination of a frame, a pair of front and rear folding devices mounted on said frame for bending and breaking the corners on one side of the blank, a like pair of front and rear folding devices mounted on said frame for bending and breaking the corners on the opposite side of the blank, each of said folding devices comprising a die member and a pair of rectangularly disposed hinged folder blades adapted to swing toward and from the sides of said die member, means for conveying blanks into the field of operation of said folding devices, and means for adjusting one pair of said folding devices toward and from the other whereby to adapt said devices to handle blanks of different widths.

21. In a blank folding machine of the character described, the combination of a frame, a group of four rectangularly disposed folding devices mounted on said frame and adapted to operate on the four corners of a rectangular blank, each of said folding devices comprising a die member and a pair of rectangularly disposed hinged folder blades adapted to swing toward and from the sides of said die member, means for conveying a blank into the field of operation of said folding devices, means for adjusting one end pair of said folding devices toward and from the other end pair, and means for adjusting one side pair of said folding devices toward and from the other side pair, whereby the machine is adapted to handle blanks of varying lengths and widths.

22. In a blank folding machine of the character described, the combination of a frame, a carriage mounted on said frame to slide lengthwise thereof, a pair of folding devices mounted on said frame and adapted to bend and break the corners at one end of a rectangular blank, a like pair of folding devices mounted on said carriage and adapted to bend and break the corners at the other end of said blank, each of said folding devices comprising a die member and a pair of rectangularly disposed hinged folder blades adapted to swing toward and from the sides of said die member, means for shifting said carriage lengthwise of said frame, and means for bodily adjusting the front and rear folding devices on one side of the machine toward and from the corresponding folding devices on the other side, whereby said machine is adapted to handle blanks of different lengths and widths.

CHAS. L. MOYER.